(12) United States Patent
Sekimoto

(10) Patent No.: US 11,068,223 B2
(45) Date of Patent: Jul. 20, 2021

(54) CONTROL SYSTEM, CONTROL METHOD, AND NON-TRANSITORY STORAGE MEDIUM STORING CONTROL PROGRAM

(71) Applicant: OMRON Corporation, Kyoto (JP)

(72) Inventor: Hidehiko Sekimoto, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/640,056

(22) PCT Filed: Nov. 20, 2018

(86) PCT No.: PCT/JP2018/042768
§ 371 (c)(1),
(2) Date: Feb. 19, 2020

(87) PCT Pub. No.: WO2019/123937
PCT Pub. Date: Jun. 27, 2019

(65) Prior Publication Data
US 2020/0225898 A1 Jul. 16, 2020

(30) Foreign Application Priority Data
Dec. 21, 2017 (JP) .............................. JP2017-244613

(51) Int. Cl.
*G06F 3/14* (2006.01)
*G05B 19/042* (2006.01)
*G06F 21/62* (2013.01)

(52) U.S. Cl.
CPC .......... *G06F 3/1423* (2013.01); *G05B 19/042* (2013.01); *G06F 3/1454* (2013.01); *G06F 21/629* (2013.01); *G05B 2219/25274* (2013.01)

(58) Field of Classification Search
CPC .... G06F 3/1423; G06F 3/1454; G06F 21/629; G05B 19/042; G05B 2219/25274; G05B 19/0423
See application file for complete search history.

(56) References Cited

U.S. PATENT DOCUMENTS

2006/0179120 A1* 8/2006 Kegoya ................ G05B 19/042
709/217
2006/0224661 A1* 10/2006 Aono .................... G05B 19/054
709/201

FOREIGN PATENT DOCUMENTS

JP  2002318608   10/2002
JP  2005157699    6/2005
(Continued)

OTHER PUBLICATIONS

Digital Electronic Corporation, "GP-Pro EX Connection Manual", retrieved on Feb. 18, 2020, available at: http://www.proface.co.jp/otasuke/files/manual/soft/gpproex/new/refer/gpproex.htm.
(Continued)

*Primary Examiner* — Carolyn R Edwards
(74) *Attorney, Agent, or Firm* — JCIPRNET

(57) ABSTRACT

An operation reception device (200) comprising: a display unit (101) for switching between and displaying a plurality of screens; a display control unit (102) for controlling the switching of the screens on the display unit (101) in a prescribed sequence; and a main control unit (103) for controlling the screen switching sequence. When the main control unit (103) receives a switching instruction from a first screen and a screen having an operation permission for changing the setting content of a sequence control device exists, switching to the screen having an operation permission is not carried out; instead, switching to a screen not having an operation permission is carried out.

7 Claims, 7 Drawing Sheets

(56) References Cited

FOREIGN PATENT DOCUMENTS

| JP | 2006277691 | 10/2006 | |
|---|---|---|---|
| WO | 2017072973 | 5/2017 | |
| WO | WO-2017072973 A1 * | 5/2017 | ........... G05B 19/042 |

OTHER PUBLICATIONS

"International Search Report (Form PCT/ISA/210) of PCT/JP2018/042768," dated Feb. 19, 2019, with English translation thereof, pp. 1-3.
"Written Opinion of the International Searching Authority (Form PCT/ISA/237) of PCT/JP2018/042768," dated Feb. 19, 2019, with English translation thereof, pp. 1-10.

* cited by examiner

CONTROL SYSTEM, CONTROL METHOD, AND NON-TRANSITORY STORAGE MEDIUM STORING CONTROL PROGRAM

CROSS-REFERENCE TO RELATED APPLICATION

This application is a 371 application of the international PCT application Ser. No. PCT/JP2018/042768, filed on Nov. 20, 2018, which claims the priority benefit of Japan application no. 2017-244613, filed on Dec. 21, 2017. The entirety of the above-mentioned patent application is hereby incorporated by reference herein and made a part of this specification.

BACKGROUND

Technical Field

The disclosure relates to a technique of switching a screen of an operation reception device.

Background Art

A technique of disabling a terminal other than a specific terminal from operating a screen, a function, and the like of the specific terminal by occupying an operation right thereof is described in Non-Patent Literature 1. By utilizing this technique, security is guaranteed using restrictions on simultaneous operation of a plurality of terminals.

Citation List

Patent Literature

Non-Patent Literature 1

Digital Electronic Corporation, GP-Pro Ex V4.0 Reference Internet URL:http://www.proface.co.jp/otasuke/files/manual/soft/gpproex/new/refer/gpproex.htm

SUMMARY

Technical Problem

However, when the technique described in Non-Patent Literature 1 is used, switching of a screen cannot be carried out due to restrictions on simultaneous operation even in a case in which a user wants to only refer to data of a control device, that is, to switch a screen which does not require an operation right, which is not convenient. An operation right is a right to update settings of a control device.

Therefore, an objective of the disclosure is to enable switching of a screen with security of a control device guaranteed when an operation is performed depending on whether an operation right is necessary or unnecessary.

Solution to Problem

An operation reception device includes: a display unit that is able to switch display between a plurality of screens; a display control unit that controls switching of a screen on the display unit in a predetermined sequence; and a main control unit that receives an switch instruction, which is an instruction for switching from a current screen, that is displaying currently, into a destination screen, that is a switch destination, and controls a switching sequence of the screens. When there is another screen between the current screen and the destination screen in the switch instruction that has been received, and if a next screen next to the current screen is a screen of which an operation right to update settings of a sequence control device is occupied, then the main control unit controls the next screen to switch to a screen which is nearest to the current screen and of which an operation right is not occupied in a sequence from the current screen to the destination screen.

With this configuration, it is possible to control switching of a screen in a sequence control device depending on whether there is an operation right to do so.

The operation reception device may further include an operation managing unit that stores the operation right and the screen of which the operation right is occupied in correlation with each other. The main control unit may transmit the operation right to the operation managing unit such that a notification indicating that the operation right of the screen is occupied is stored by receiving an operation input to the screen of which the operation right is occupied from the display unit.

With this configuration, an operation right and a screen can be stored in correlation for the screen requiring the operation right.

The operation reception device may further include a communication unit that transmits and receives the operation right.

With this configuration, the operation reception device is connected to the sequence control device via a network, and can transmit and receive an operation right thereto and therefrom and share information relevant to the operation right.

A control system according to the disclosure includes a main operation reception device and a portable operation reception device having the same configuration as the above-mentioned operation reception device. The main operation reception device includes a main communication unit which is the same as the communication unit. The portable operation reception device includes a portable communication unit which is the same as the communication unit. The main communication unit and the portable communication unit may transmit and receive the operation right to and from each other.

With this configuration, by causing the communication units of the main operation reception device and the portable operation reception device to transmit and receive an operation right, both devices can share the operation right.

The portable communication unit of the control system may receive the operation right from the main communication unit. A main control unit of the portable operation reception device of the control system may control a screen switching sequence of a display unit of the portable operation reception device on the basis of the operation right.

With this configuration, when an operation right of a screen is occupied during operation by the portable operation reception device, it is possible to control a screen switching sequence.

The control system may include the main operation reception device, the portable operation reception device, and the sequence control device which are connected to each other. The sequence control device of the control system may include: a control-body communication unit that transmits and receives control parameters which are used for processes of the sequence control device and control data including the operation right; and a control-body main control unit that performs control based on the control data.

With this configuration, since the main operation reception device, the portable operation reception device, and the sequence control device are provided, an operation right can be shared by transmitting and receiving the operation right to and from the devices.

Advantageous Effects of Invention

According to the disclosure, it is possible to improve convenience by enabling switching of a screen with security of a control device guaranteed when operation is performed depending on whether an operation right is necessary or unnecessary.

DESCRIPTION OF THE EMBODIMENTS

First Embodiment

Figure 1:
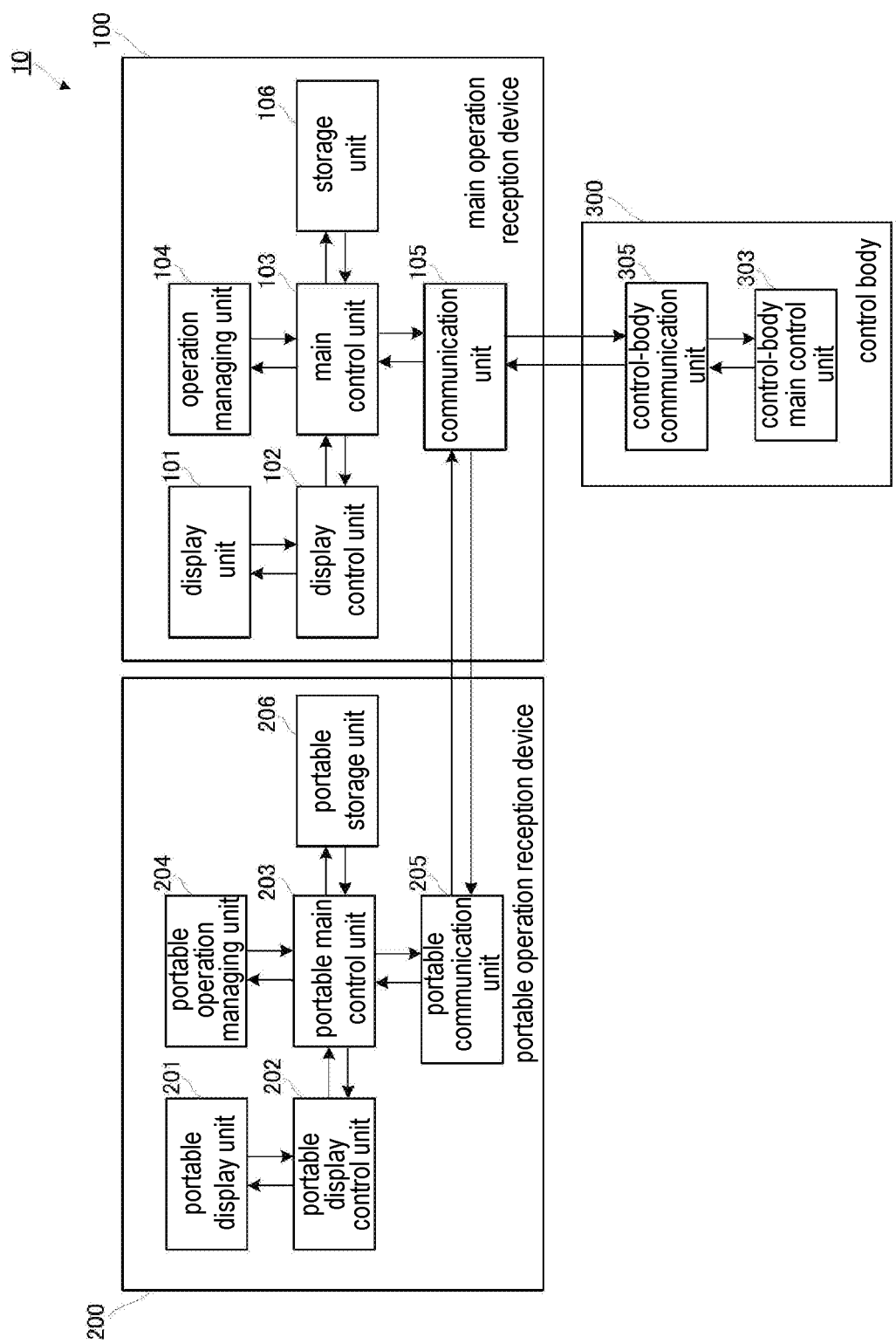
FIG. 1 is a block diagram illustrating a principal configuration of a control system according to a first embodiment of the disclosure.
Figure 2:
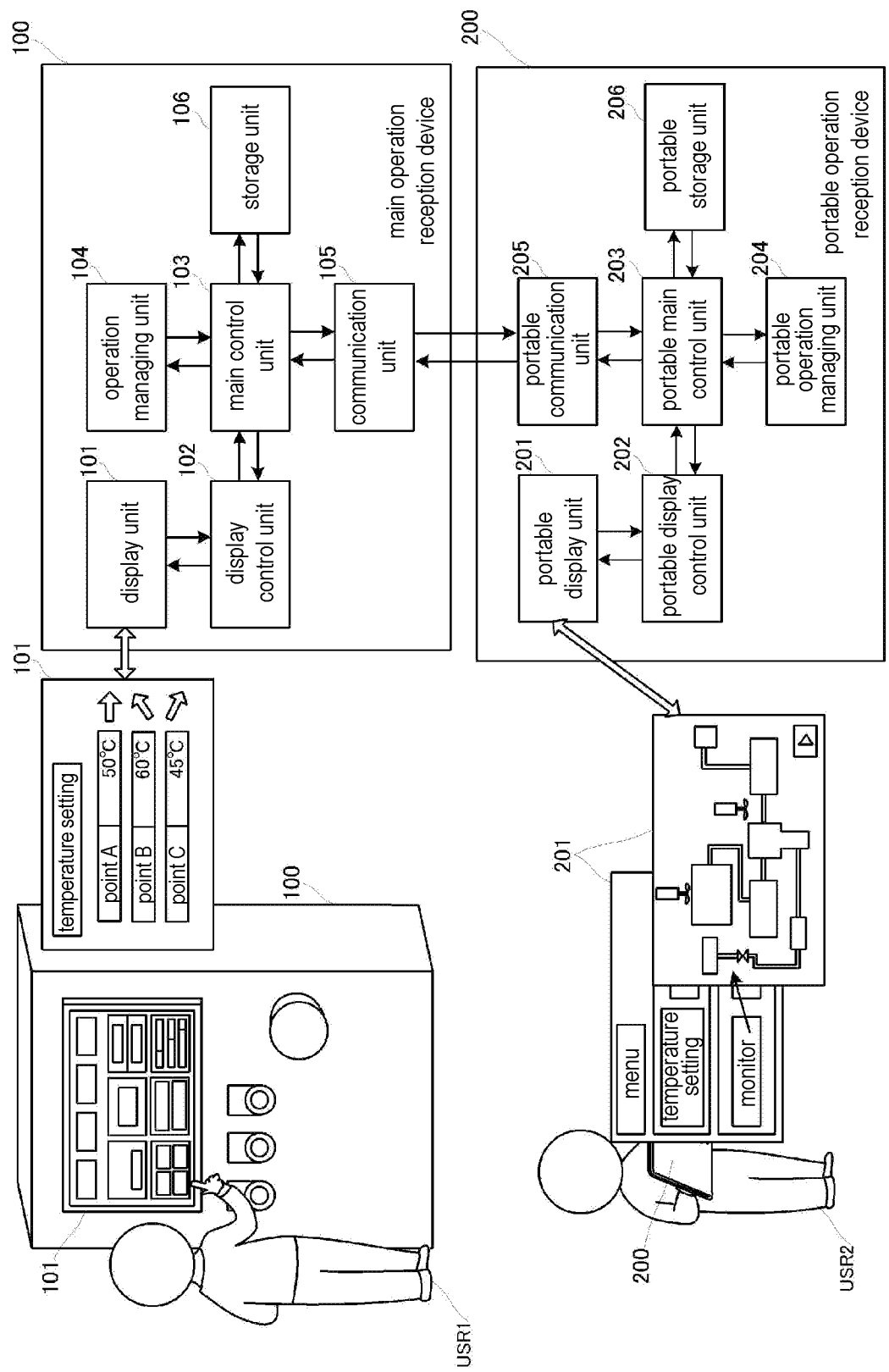
FIG. 2 is a diagram illustrating the outline of the control system according to the first embodiment of the disclosure.
Figure 3:
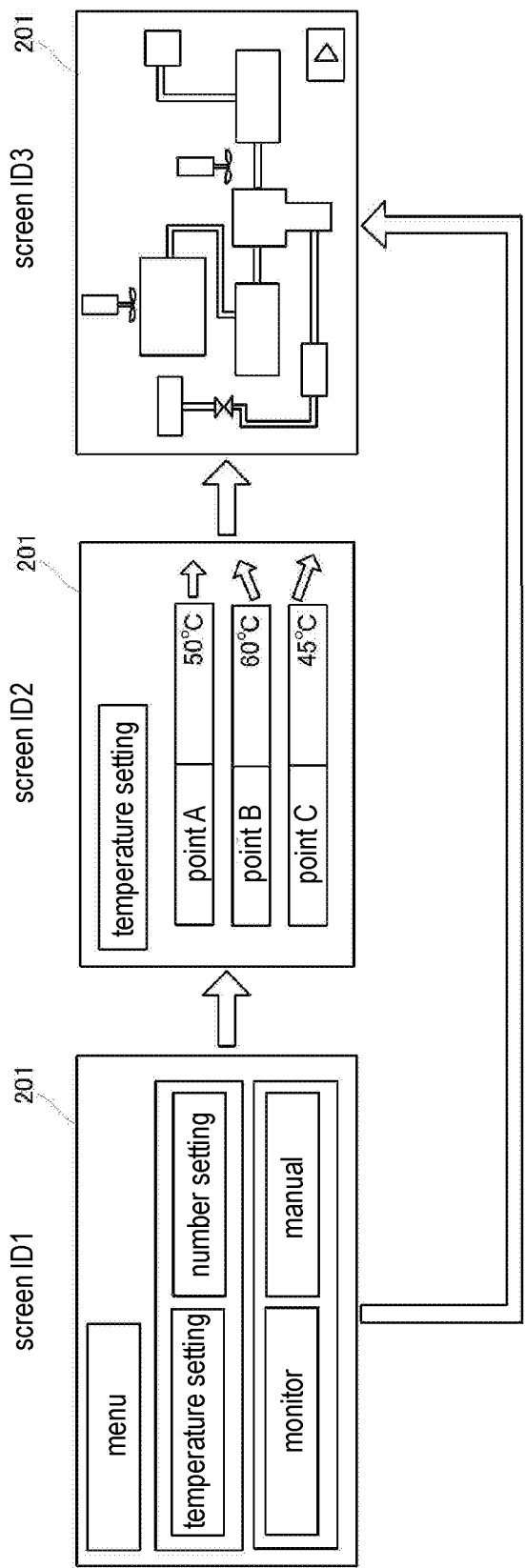
FIG. 3 is a conceptual diagram illustrating switching of a screen according to the first embodiment of the disclosure.
Figure 4:
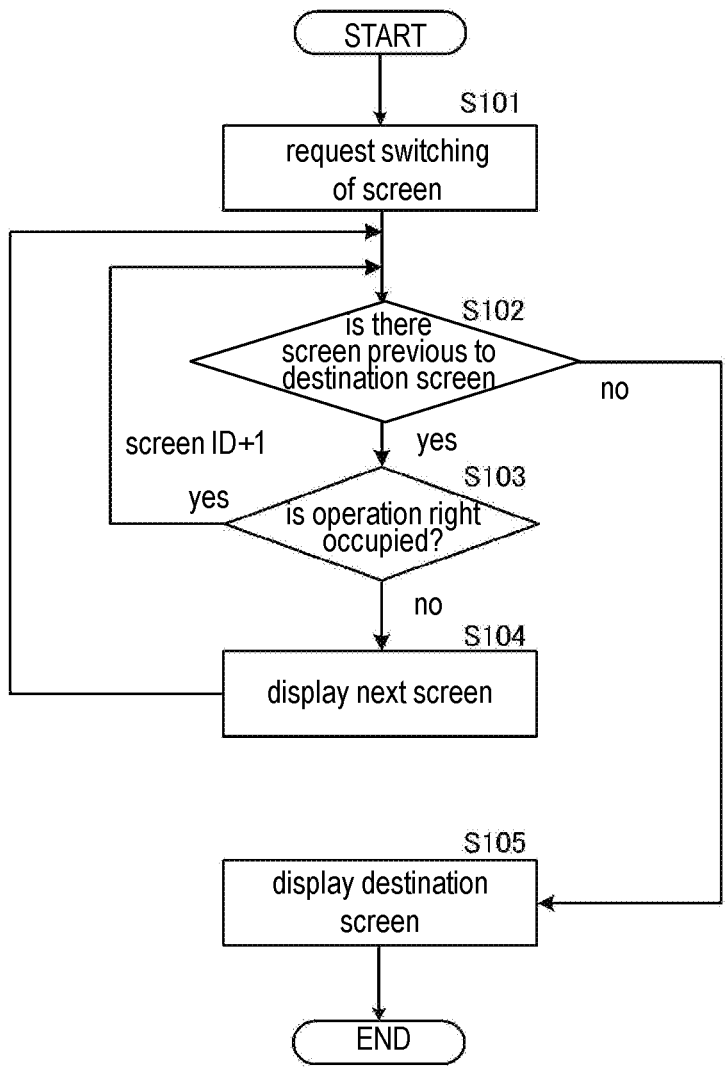
FIG. 4 is a flowchart illustrating switching of a screen according to the first embodiment of the disclosure.
Figure 5:
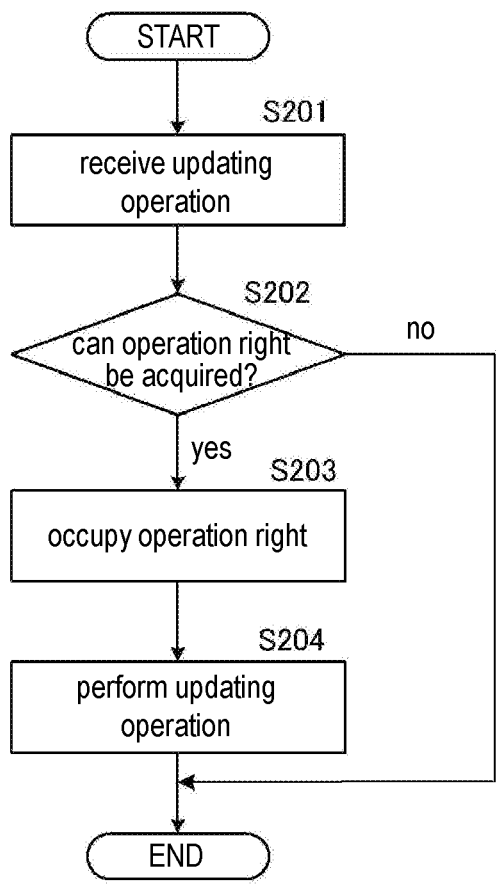
FIG. 5 is a flowchart illustrating registration of an operation right according to the first embodiment of the disclosure.

An operation reception device, a control system, a control method, and a control program according to a first embodiment of the disclosure will be described with reference to the accompanying drawings. FIG. 1 is a block diagram illustrating a principal configuration of a control system according to the first embodiment of the disclosure. FIG. 2 is a diagram illustrating the outline of the control system according to the first embodiment of the disclosure. FIG. 3 is a conceptual diagram illustrating switching of a screen according to the first embodiment of the disclosure. FIG. 4 is a flowchart illustrating switching of a screen according to the first embodiment of the disclosure. FIG. 5 is a flowchart illustrating registration of an operation right according to the first embodiment of the disclosure.

As illustrated in FIG. 1, the control system 10 includes a main operation reception device 100, a portable operation reception device 200, and a control body 300.

The main operation reception device 100 includes a display unit 101, a display control unit 102, a main control unit 103, an operation managing unit 104, a communication unit 105, and a storage unit 106. The portable operation reception device 200 includes a portable display unit 201, a portable display control unit 202, a portable main control unit 203, a portable operation managing unit 204, a portable communication unit 205, and a portable storage unit 206. The control body 300 includes a control-body main control unit 303 and a control-body communication unit 305. The control-body main control unit 303 controls the control body 300. The control-body communication unit 305 communicates with the communication unit 105 of the main operation reception device.

The configuration of the main operation reception device 100 will be described below. IDs are set for screens according to the display sequence of the screens and are hereinafter referred to as screen IDs. The screen IDs are character strings including continuous numerical values. When control according to the disclosure is not performed, the screens are switched in ascending order of the numerical values of the screen IDs.

The display unit 101 has a display function which is constituted by a liquid crystal panel or the like and displays control data. The display unit 101 includes an operation interface including a position input device such as a touch panel.

The display control unit 102 controls switching of a screen which is displayed on the display unit 101. The display control unit 102 receives a screen switching operation which is performed on the display unit 101 and transmits a screen ID of a destination to the main control unit 103.

The main control unit 103 receives the screen ID which is transmitted from the display control unit 102. The main control unit 103 transmits the screen ID which is displayed on the display unit 101 to the display control unit 102. The main control unit 103 transmits the screen ID received by the display unit 101 to the operation managing unit 104. The main control unit 103 stores control data in the storage unit 106. The main control unit 103 transmits the screen ID and an operation right to the communication unit 105. The main control unit 103 acquires control data from the storage unit 106.

The operation managing unit 104 ascertains whether the operation right of the screen indicated by the screen ID is occupied on the basis of the screen ID transmitted from the main control unit 103. When the operation right is occupied, a notification indicating that switching to the screen is not possible is transmitted to the main control unit 103. When the operation right is not occupied, the screen ID of a destination is transmitted to the main control unit 103.

When a screen ID of which an operation right is occupied is included between the screen ID which is currently displayed and the destination screen ID, the operation managing unit 104 does not transmit the screen ID of which the operation right is occupied but transmits the destination screen ID to the main control unit 103. For example, a screen ID1, a screen ID2, and a screen ID3 are set as the screen IDs, switching from the screen ID1 to the screen ID3 is performed. When the operation right of the screen ID2 is occupied, the operation managing unit 104 transmits the destination screen ID as the screen ID3 to the main control unit 103.

The communication unit 105 communicates with the portable communication unit 205 and the control-body communication unit 305 connected to the same network in accordance with an instruction from the main control unit 103. The communication unit 105 transmits and receives the operation right.

The storage unit 106 stores the control data.

The configuration of the portable operation reception device 200 will be described below.

The portable display unit 201 has a display function which is constituted by a liquid crystal panel or the like and displays the control data. The portable display unit 201 includes an operation interface including a position input device such as a touch panel.

The portable display control unit 202 controls switching of a screen which is displayed on the portable display unit 201. The portable display control unit 202 receives a screen switching operation which is performed on the portable display unit 201 and transmits the destination screen ID to the portable main control unit 203.

The portable main control unit 203 receives the screen ID which is transmitted from the portable display control unit 202. The portable main control unit 203 transmits the screen ID which is displayed on the portable display unit 201 to the portable display control unit 202. The portable main control unit 203 transmits the screen ID received from the portable display unit 201 to the portable operation managing unit 204.

The portable main control unit 203 stores control data in the portable storage unit 206. The portable main control unit 203 transmits the screen ID and the operation right to the portable communication unit 205. The portable main control unit 203 acquires control data from the portable storage unit 206.

The portable operation managing unit 204 ascertains whether the operation right of the screen indicated by the screen ID is occupied on the basis of the screen ID transmitted from the portable main control unit 203. When the operation right is occupied, a notification indicating that switching of a screen is not possible is transmitted to the portable main control unit 203. When the operation right is not occupied, the screen ID of the switching destination is transmitted to the portable main control unit 203.

When a screen ID of which the operation right is occupied is included between the screen ID which is currently displayed and the destination screen ID, the portable operation managing unit 204 does not transmit the screen ID of which the operation right is occupied but transmits the destination screen ID to the portable main control unit 203.

The portable communication unit 205 communicates with the communication unit 105 which is connected to the same network in accordance with an instruction from the portable main control unit 203. The portable communication unit 205 transmits and receives the operation right. That is, the operation right which is used for the portable operation managing unit 204 is the same as the operation right in the operation managing unit 104.

Even when there is a plurality of portable operation reception devices, the operation rights of the main operation reception device 100 and the portable operation reception devices 200 which are connected to the same network can be shared.

The portable storage unit 206 stores control data.

The portable operation reception device 200 may be a device which does not include the portable operation managing unit 204 and the portable storage unit 206. In this case, the portable operation reception device 200 can receive control data from the main operation reception device 100 by streaming.

FIG. 2 is a diagram schematically illustrating an outline of a configuration in which the main operation reception device 100 and the portable operation reception device 200 are simultaneously used over the same network. FIG. 3 is a conceptual diagram illustrating an example in which a screen is switched in the portable operation reception device 200. As illustrated in FIG. 2, there are an operator USR1 who operates the display unit 101 of the main operation reception device 100 and an operator USR2 who operates the portable display unit 201 of the portable operation reception device 200. As illustrated in FIG. 3, the screen switching sequence is a sequence of a menu screen of the screen ID1, a temperature setting screen of the screen ID2, and a temperature setting monitor screen of the screen ID3. It is assumed that the operator USR1 and the operator USR2 have equivalent operation rights.

The operator USR1 changes the temperature setting on the display unit 101. The temperature setting requires an operation right. The display unit 101 transmits the change of the temperature setting and the screen ID to the display control unit 102. The display control unit 102 transmits the change of the temperature setting and the screen ID to the main control unit 103.

The main control unit 103 transmits a notification indicating that the temperature setting has changed and the screen ID2 to the operation managing unit 104.

The operation managing unit 104 determines whether the screen requires an operation right using the screen ID2. When the screen requires an operation right, the operation managing unit 104 stores the screen ID2 and the notification indicating that the operation right is occupied.

The main control unit 103 transmits the notification indicating that the temperature setting has changed to the storage unit 106. The storage unit 106 stores the change of the temperature setting.

Then, the operator USR2 instructs to switch a screen from the menu screen on the portable display unit 201 such that the temperature setting is monitored.

The portable display unit 201 transmits the screen ID1 of the screen which is currently displayed and the screen ID3 which is a screen of a switching destination to the portable display control unit 202. The portable main control unit 203 transmits the screen ID1 and the screen ID3 to the portable communication unit 205. The portable communication unit 205 transmits the screen ID1 and the screen ID3 to the communication unit 105.

The communication unit 105 transmits the screen ID1 and the screen ID3 to the main control unit 103. The main control unit 103 transmits the screen ID1 and the screen ID3 to the operation managing unit 104.

The operation managing unit 104 determines whether there is a screen with another screen ID between the screen ID1 and the screen ID3, and determines the operation right of the screen ID2 when there is a screen with the screen ID2. Since the operation right of the screen ID2 is occupied, the operation managing unit 104 transmits the screen ID3 to the main control unit 103.

The main control unit 103 transmits the screen ID3 to the communication unit 105. The communication unit 105 transmits the screen ID3 to the portable communication unit 205.

The portable communication unit 205 transmits the screen ID3 to the portable main control unit 203. The portable main control unit 203 transmits the screen ID3 to the portable display control unit 202, and stores the screen ID3 in the portable operation managing unit 204.

The portable display control unit 202 transmits the screen ID3 to the portable display unit 201 such that the screen is switched to the screen ID3. The portable display unit 201 switches the screen to the screen ID3.

In the above description, when the operation right of the screen ID2 is not occupied at the time of switching of the screen to the screen ID2 by the portable display unit 201, the communication unit 105 transmits the screen ID2 to the portable communication unit 205. When the operation right of the screen ID2 is occupied, the communication unit 105 transmits a notification indicating that the operation right is occupied to the portable communication unit 205.

Accordingly, when there is a screen of which an operation right is occupied between the screen which is currently displayed and the screen of a switching destination, the portable display unit 201 can skip the screen of which the operation right is occupied and display a destination screen.

FIG. 4 is a flowchart illustrating switching of a screen according to the first embodiment of the disclosure. The flowchart illustrated in FIG. 4 is commonly used for the main operation reception device 100 and the portable operation reception device 200.

The flowchart for the main operation reception device 100 will be described below. The display unit 101 requests switching of a screen (S101). It is determined whether there is a screen (hereinafter referred to as a destination-previous screen) previous to a destination screen (S102).

When there is a destination-previous screen (S102: YES), it is determined whether an operation right of the destination-previous screen is occupied (S103).

When the operation right of the destination-previous screen is occupied (S103: YES), the screen ID is increased by 1 and the process of S102 is performed again.

When the operation right of the destination-previous screen is not occupied (S103: NO), a next screen is displayed (S104) and the process of S102 is performed again.

When there is no destination-previous screen (S102: NO), the destination screen is displayed (S105).

FIG. 5 is a flowchart illustrating registration of an operation right according to the first embodiment of the disclosure. The flowchart illustrated in FIG. 5 is commonly used for the main operation reception device 100 and the portable operation reception device 200.

The flowchart for the main operation reception device 100 will be described below. The display unit 101 starts an updating operation using a setting screen (S201). The operation managing unit 104 determines whether an operation right of a setting screen on the display unit 101 can be acquired (S202). When the operation right of the setting screen can be acquired (S202: YES), the operation managing unit 104 occupies the operation right (S203). The display unit 101 transmits the operation right to the main control unit 103 via the display control unit 102. The main control unit 103 updates the storage unit 106 (S204).

When the operation right cannot be acquired (S204), the operation managing unit 104 ends the process flow. That is, when the operation right is already occupied, the updating operation is not performed by exclusive control.

Second Embodiment

Figure 6:
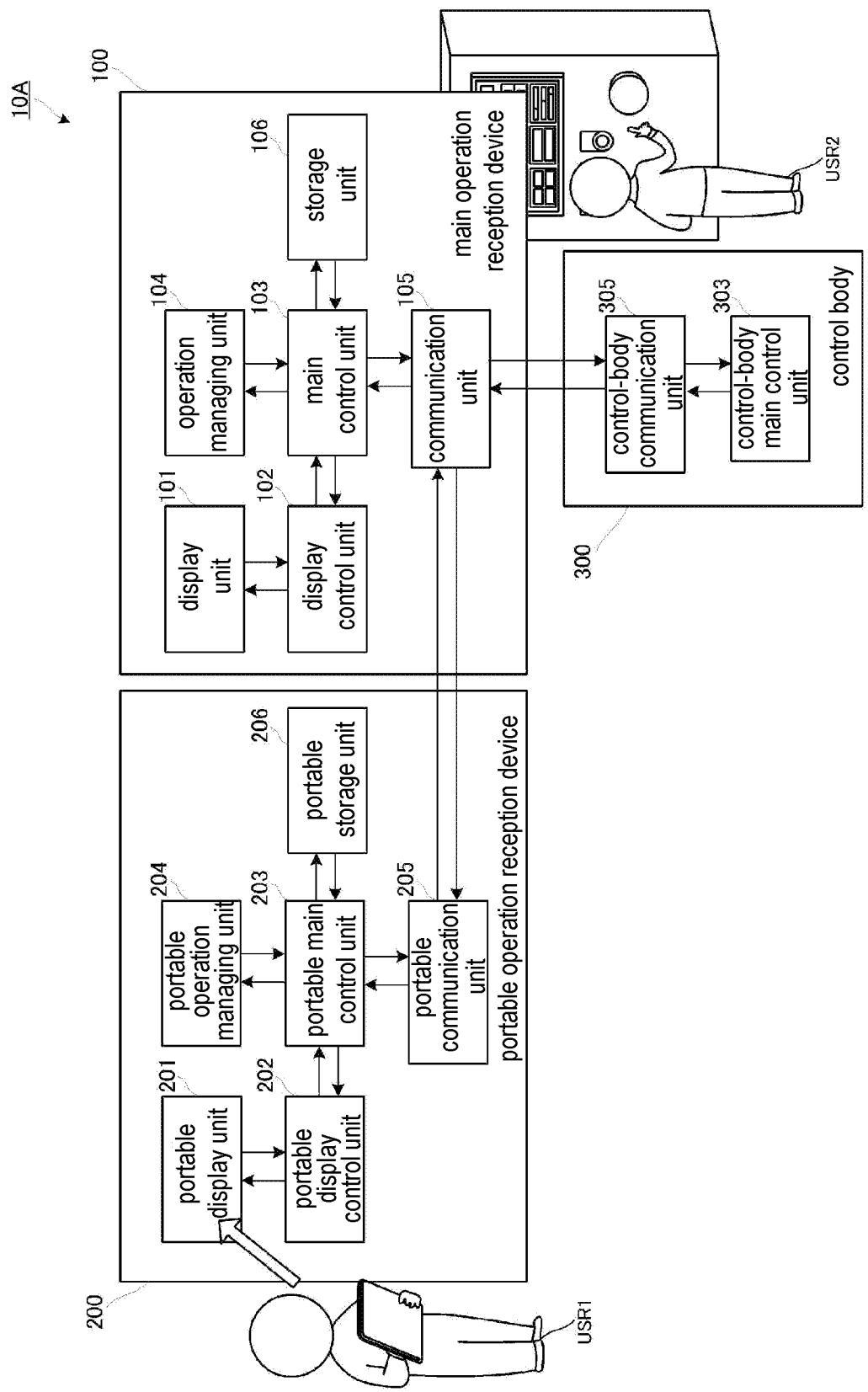
FIG. 6 is a relevant conceptual diagram of a diagram and a block diagram illustrating the outline of a control system according to a second embodiment of the disclosure.
Figure 7:
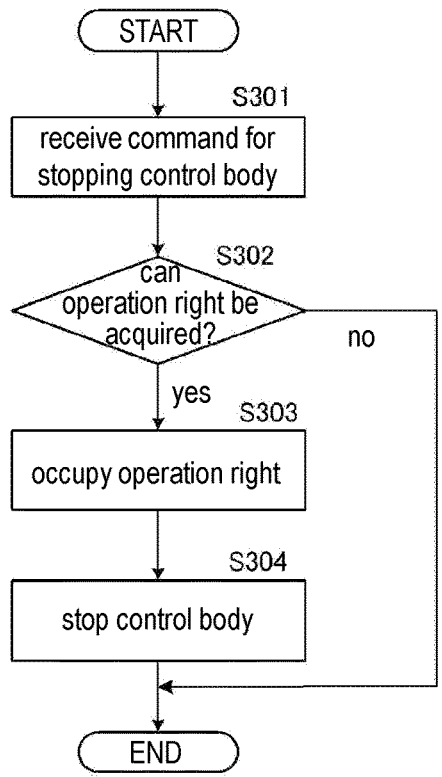
FIG. 7 is a flowchart illustrating stopping of a control body according to the second embodiment of the disclosure.
Figure 8:
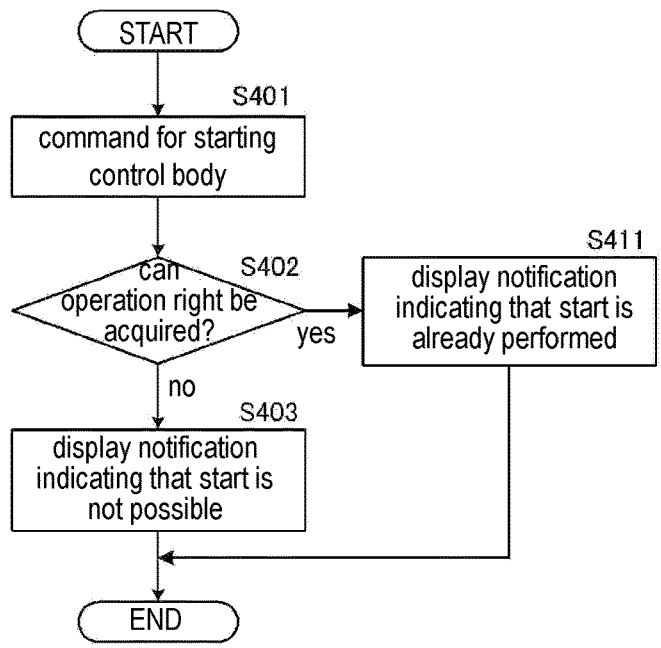
FIG. 8 is a flowchart illustrating execution of starting the control body from another device when the control body according to the second embodiment of the disclosure is stopped.

A portable operation reception device, a control system, a control method, and a control program according to a second embodiment of the disclosure will be described below with reference to the accompanying drawings. FIG. 6 is a relevant conceptual diagram of a diagram and a block diagram illustrating the outline of the control system according to the second embodiment of the disclosure. FIG. 7 is a flowchart illustrating stopping of a control body according to the second embodiment of the disclosure. FIG. 8 is a flowchart illustrating execution of starting the control body from another device when the control body according to the second embodiment of the disclosure is stopped.

As illustrated in FIG. 6, a control system 10A includes a main operation reception device 100, a portable operation reception device 200, and a control body 300. The control system 10A is different from the control system 10 in that an operator USR1 who operates the main operation reception device 100 operates the control body. The other constituents of the control system 10A are the same as in the control system 10 and description thereof will not be repeated.

The operator USR2 performs an operation of stopping the control body 300 using the display unit 101 of the main operation reception device 100.

The display unit 101 transmits a command for stopping the control body 300 to the display control unit 102. The display control unit 102 transmits the command to the main control unit 103. The main control unit 103 transmits the command for stopping the control body 300 to the communication unit 105. The main control unit 103 transmits the command for stopping the control body 300 to the operation managing unit 104. The operation managing unit 104 stores the command for stopping the control body 300. Accordingly, the operation managing unit 104 stores a notification indicating that an operation right of the control body 300 is occupied.

The communication unit 105 transmits the command for stopping the control body 300 to the control-body communication unit 305. The control-body communication unit 305 transmits the command for stopping the control body 300 to the control-body main control unit 303. The control-body main control unit 303 stops the control body 300.

The operator USR1 transmits a command for starting the control body 300 using the portable display unit 201 of the portable operation reception device 200. The portable display unit 201 transmits the command for starting the control body 300 to the portable display control unit 202. The portable display control unit 202 transmits the command for starting the control body 300 to the portable main control unit 203.

The portable main control unit 203 transmits the command for starting the control body 300 to the portable communication unit 205. The portable communication unit 205 transmits the command for starting the control body 300 to the communication unit 105. The communication unit 105 transmits the command for starting the control body 300 to the main control unit 103. The main control unit 103 inquires of the operation managing unit 104 about whether the operation right of the control body 300 is occupied. The main control unit 103 causes the operation managing unit 104 to search for the operation right of the control body 300 and to transmit a notification indicating that the operation right is occupied to the main control unit 103.

The main control unit 103 transmits a notification indicating that the operation right of the control body 300 is occupied by the main operation reception device 100 and the control body 300 is stopped to the communication unit 105. The communication unit 105 transmits the notification indicating that the operation right of the control body 300 is occupied and the control body 300 is stopped to the portable communication unit 205.

The portable communication unit 205 transmits the notification indicating that the control body 300 is stopped to the portable main control unit 203. The portable main control unit 203 transmits the notification indicating that the control body 300 is stopped to the portable display control unit 202. The portable display control unit 202 displays a message indicating that the control body 300 is stopped on the portable display unit 201.

The operator USR1 ascertains the message displayed on the portable display unit 201 and recognizes that the control body 300 cannot be started.

FIG. 7 is a flowchart illustrating stopping of the control body according to the second embodiment of the disclosure. It is assumed that the control body 300 is first stopped by the main operation reception device 100 and the control body 300 is then started by the portable operation reception device 200. The flowchart illustrated in FIG. 7 describes the operations in the main operation reception device 100.

The display unit 101 performs stopping of the control body 300 (S301). The operation managing unit 104 determines whether an operation right to stop the control body 300 can be acquired (S302). When the operation right can be acquired (S302: YES), the operation managing unit 104 occupies the operation right (S303). The display unit 101 transmits a stopping command to the main control unit 103. The main control unit 103 transmits the stopping command of the control body 300 to the control-body communication unit 305 via the communication unit 105, and stops the control body 300 (S304).

When the operation right cannot be acquired (S302: NO), the operation managing unit 104 ends the process flow. That is, when the operation right is already occupied, the control body 300 cannot be stopped by exclusive control.

FIG. 8 is a flowchart illustrating starting of the control body according to the second embodiment of the disclosure. First, the main operation reception device 100 already stops the control body 300, and then the portable operation reception device 200 starts the control body 300. The flowchart illustrated in FIG. 8 describes the operations in the portable operation reception device 200.

The portable display unit 201 performs starting of the control body 300 (S401). The portable operation managing unit 204 determines whether an operation right to start the control body 300 can be acquired (S402). When the operation right cannot be acquired (S402: NO), the portable operation managing unit 204 transmits a notification indicating that starting of the control body 300 is not possible to the portable main control unit 203. The portable display control unit 202 displays the notification indicating that starting of the control body 300 is not possible on the portable display unit 201 (S403).

When the operation right can be acquired (S402: YES), the portable operation managing unit 204 transmits a notification indicating that the control body 300 is already started to the portable main control unit 203 (S411).

In the above-mentioned embodiments, it is preferable that the operation managing unit 104 and the portable operation managing unit 204 be always synchronized with each other in the states of operation rights.

When they cannot be synchronized with each other in the operation rights, they may be synchronized with each other in the operation rights at the time of switching of the screen or stopping of the control body.

REFERENCE SIGNS LIST

USR1, USR2 Operator
10, 10A Control system
100 Main operation reception device
101 Display unit
102 Display control unit
103 Main control unit
104 Operation managing unit
105 Communication unit
106 Storage unit
200 Portable operation reception device
201 Portable display unit
202 Portable display control unit
203 Portable main control unit
204 Portable operation managing unit
205 Portable communication unit
206 Portable storage unit
300 Control body
303 Control-body main control unit
305 Control-body communication unit

What is claimed is:

1. A control system comprising a main operation reception device and a portable operation reception device having the same configuration as an operation reception device, the operation reception device comprising:

a display unit that is able to switch display between a plurality of screens;
a display control unit that controls switching of a screen on the display unit in a predetermined sequence;
a main control unit that receives a switch instruction, which is an instruction for switching from a current screen, that is displaying currently, into a destination screen, that is a switch destination, and controls a switching sequence of the screens; and
a communication unit that transmits and receives the operation right;
wherein when there is another screen between the current screen and the destination screen in the switch instruction that has been received, and if a next screen next to the current screen is a screen of which an operation right to update settings of a sequence control device is occupied, then the main control unit controls the next screen to switch to a screen which is nearest to the current screen and of which an operation right is not occupied in a sequence from the current screen to the destination screen,
wherein the main operation reception device comprises a main communication unit which is the same as the communication unit,
wherein the portable operation reception device comprises a portable communication unit which is the same as the communication unit, and
wherein the main communication unit and the portable communication unit transmit and receive the operation right to and from each other,
wherein the main operation reception device, the portable operation reception device, and the sequence control device are connected to each other,
wherein the sequence control device comprises:
a control-body communication unit that transmits and receives control parameters which are used for processes of the sequence control device and control data including the operation right; and
a control-body main control unit that performs control based on the control data.

2. The control system according to claim 1, wherein the operation device comprises an operation managing unit that stores the operation right and the screen of which the operation right is occupied in correlation with each other,
wherein the main control unit transmits the operation right to the operation managing unit such that a notification indicating that the operation right of a screen requiring the operation right is occupied is stored by receiving an operation input to the screen.

3. The control system according to claim 1, wherein the portable communication unit receives the operation right from the main communication unit, and
wherein a main control unit of the portable operation reception device controls a screen switching sequence of a display unit of the portable operation reception device on the basis of the operation right.

4. The control system according to claim 1, wherein the operation device comprises a communication unit that transmits and receives the operation right.

5. The control system according to claim 1, wherein the operation device comprises an operation managing unit that stores the operation right and the screen of which the operation right is occupied in correlation with each other,
wherein the main control unit transmits the operation right to the operation managing unit such that a notification indicating that the operation right of a screen requiring the operation right is occupied is stored by receiving an operation input to the screen.

6. A control method of causing an operation reception device to perform:
   a first process, controlling switching of a screen of a display unit in a predetermined sequence; and
   a second process, receiving a switch instruction, which is an instruction for switching from a current screen, that is displaying currently, into a destination screen, that is a switch destination, and controlling a switching sequence of the screens,
   wherein the second process is that when there is another screen between the current screen and the destination screen in the switch instruction that has been received, and if a next screen next to the current screen is a screen of which an operation right to update settings of a sequence control device is occupied, then controls the next screen to switch to a screen which is nearest to the current screen and of which the operation right is not occupied in a sequence from the current screen to the destination screen,
   wherein the control method of causing the operation reception device to further perform:
   transmitting and receiving the operation right to and from each other,
   wherein the sequence control device comprises:
      a control-body communication unit that transmits and receives control parameters which are used for processes of the sequence control device and control data including the operation right; and
      a control-body main control unit that performs control based on the control data.

7. A non-transitory storage medium storing a control program, which causes a computer to perform:
   a first process, controlling switching of a screen of a display unit in a predetermined sequence; and
   a second process, receiving a switch instruction, which is an instruction for switching from a current screen, that is displaying currently, into a destination screen, that is a switch destination, and controlling a switching sequence of the screens,
   wherein the second process is that when there is another screen between the current screen and the destination screen in the switch instruction that has been received, and if a next screen next to the current screen is a screen of which an operation right to update settings of a sequence control device is occupied, then controls the next screen to switch to a screen which is nearest to the current screen and of which the operation right is not occupied in a sequence from the current screen to the destination screen,
   wherein the non-transitory storage medium causes the computer to further perform:
   transmitting and receiving the operation right to and from each other,
   wherein the sequence control device comprises:
      a control-body communication unit that transmits and receives control parameters which are used for processes of the sequence control device and control data including the operation right; and
      a control-body main control unit that performs control based on the control data.

\* \* \* \* \*